United States Patent
Smit

(10) Patent No.: US 10,821,354 B2
(45) Date of Patent: Nov. 3, 2020

(54) DEVICE FOR CONTROLLING A VIDEO GAME

(71) Applicant: F. SMIT HOLDING B.V., Doetinchem (NL)

(72) Inventor: Fernando Smit, Doetinchem (NL)

(73) Assignee: F.SMIT HOLDING B.V., Doetinchem (NL)

( * ) Notice: Subject to any disclaimer, the term of this patent is extended or adjusted under 35 U.S.C. 154(b) by 0 days.

(21) Appl. No.: 15/307,057

(22) PCT Filed: May 1, 2015

(86) PCT No.: PCT/NL2015/050300
§ 371 (c)(1),
(2) Date: Oct. 27, 2016

(87) PCT Pub. No.: WO2015/167339
PCT Pub. Date: Nov. 5, 2015

(65) Prior Publication Data
US 2017/0056763 A1    Mar. 2, 2017

(30) Foreign Application Priority Data

May 2, 2014  (NL) .................................... 2012740

(51) Int. Cl.
*A63F 13/98* (2014.01)
*A63F 13/90* (2014.01)
(Continued)

(52) U.S. Cl.
CPC ............. *A63F 13/02* (2013.01); *A63F 13/06* (2013.01); *A63F 13/08* (2013.01); *A63F 13/24* (2014.09);
(Continued)

(58) Field of Classification Search
CPC ....... A63F 13/245; A63F 13/803; G09B 9/04; E05C 5/00; E05C 5/02; E05C 5/04;
(Continued)

(56) References Cited

U.S. PATENT DOCUMENTS 4,159,815 A * 7/1979 Strowik .................... B60N 2/08
248/429
4,291,856 A   9/1981 Urai
(Continued)

FOREIGN PATENT DOCUMENTS

WO           99/30789 A1    6/1999

OTHER PUBLICATIONS

International Search Report and Written Opinion dated Aug. 3, 2015 for PCT application PCT/NL2015/050300 filed May 1, 2015.
(Continued)

*Primary Examiner* — William H McCulloch, Jr.
*Assistant Examiner* — Ankit B Doshi

(57) ABSTRACT

The invention relates to a device for controlling a video game, comprising a seat, at least one operating member connected to the video game, means for displacing the seat and the at least one operating member relative to each other and means for fixing the seat and the at least one operating member in a number of different positions relative to each other. According to an aspect of the invention, the fixation means are form-fitting. The fixatin means can here comprise a gear rack and a toothed block for placing into engagement therewith. The toothed block and the gear rack can be movable toward and away from each other in the direction of their toothing or be pivotable relative to each other parrallel to the toothing. According to another aspect of the invention, the displacing means comprise a pair of mutually parallel rails and a pair of bearing blocks slidable therealong. Each rail can have a substantially round, optionally solid
(Continued)

Figure 1:
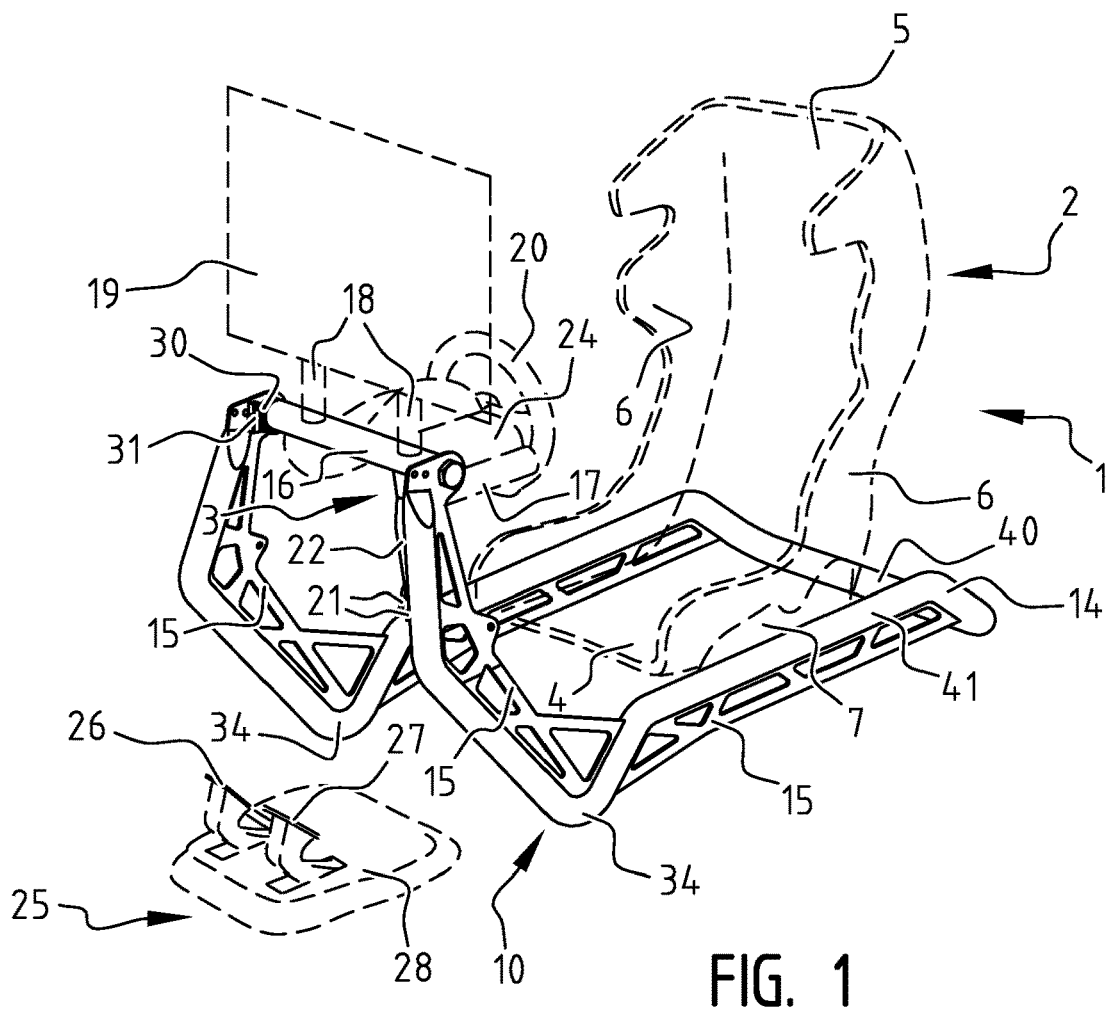

cross-section and each bearing block can have a substantially round opening through which the corresponding rail protrudes.

19 Claims, 4 Drawing Sheets

(51) Int. Cl.
*A63F 13/20* (2014.01)
*A63F 13/24* (2014.01)
*A63F 13/245* (2014.01)

(52) U.S. Cl.
CPC ............ *A63F 13/245* (2014.09); *A63F 13/90* (2014.09); *A63F 2300/1043* (2013.01); *A63F 2300/1062* (2013.01)

(58) Field of Classification Search
CPC ......... E05C 2005/005; Y10T 292/0863; Y10T 292/0864; Y10T 292/0867; Y10T 292/0868; Y10T 292/0869; Y10T 292/68; Y10T 292/696; Y10T 292/699; Y10T 292/702; Y10T 292/306; Y10T 292/307; Y10T 292/308

USPC ............................ 297/344.11; 74/424, 89.17
See application file for complete search history.

(56) References Cited

U.S. PATENT DOCUMENTS

| | | | |
|---|---|---|---|
| 6,083,106 A * | 7/2000 | McDowell | A63F 13/02 434/62 |
| 7,740,316 B2 * | 6/2010 | Beneker | B60R 22/26 297/344.11 |
| 2005/0159219 A1 * | 7/2005 | Oswald | A47C 15/004 463/36 |

OTHER PUBLICATIONS

Anonymous: "RS1 DIY Cockpit Plans and Templates (rev. 3.2) - Made for Logitech G25/G27", Apr. 9, 2014 URL: https://web.archive.org/web/20140409053803/https://www.ricmotech.com/RS1_DIY_Cockpit Plans_p/rmt-rs1-diy.htm.
Communication pursuant to Article 94(3) EPC, European Patent Office, Mar. 28, 2019.

* cited by examiner

DEVICE FOR CONTROLLING A VIDEO GAME

The invention relates to a device for controlling a video game, comprising a seat, at least one operating member connected to the video game, means for displacing the seat and the at least one operating member relative to each other and means for fixing the seat and the at least one operating member in a number of different positions relative to each other. Such a control device is known in many variants.

Video games are traditionally played in amusement arcades. Generally arranged here are setups which simulate the driving seat of the subject of the game, for instance a racing car or an aircraft. Such setups comprise a driver's seat, one or more members for operating by hand, such as a steering wheel, a gear lever or a joystick, and one or more members for operating with the feet, such as brake and accelerator pedals. In addition, such a setup comprises one or more screens facing toward the player in the seat and usually a number of loudspeakers. The enjoyment of the video game is optimal in such a setup.

Since the introduction of the personal computer video games can also be played by users at home on their own computer. Use was initially made here of keys or a computer mouse to control the game. For very many games this was found to be unsatisfactory, so that separate joysticks, steering wheels and gear levers were developed for this purpose. For optimal enjoyment, particularly of video games involving control of a vehicle or aircraft, pedal sets and special seats then also became commercially available. Serious players have at home control devices wherein the seat and the operating members are connected to each other to form an integrated whole.

Control devices of the above described type are already known from applicant's earlier patent publications WO 2005/103240, EP 1 923 107 and WO 2010/059034. In these known devices the seat is generally connected to the operating member or the operating members by means of a telescopic rod, or a rod with a sleeve slidable therealong. For fixation of the components relative to each other use is generally made in these known devices of clamping mechanisms, for instance a clamping bolt or a lever with eccentric. It has been found in practice however that the guiding and the fixation in these known control devices are not optimal.

The invention therefore has for its object to provide a control device of the above described type wherein the relative displacement and the mutual fixation of the seat and the operating members are improved. According to a first aspect of the invention, such a control device is obtained in that the fixation means are form-fitting. Such form-fitting fixation means result in a better fixation of the relative position of the seat and the operating members than the force-locked fixation means known heretofore in the form of clamping systems.

The fixation means can for instance comprise a gear rack and a toothed block for placing into engagement therewith. This ensures a form-fitting fixation of the seat relative to the operating members.

When the seat is the fixed reference, the gear rack can advantageously be connected to the seat and the toothed block can be connected to the at least one operating member. If on the other hand the seat is displaceable relative to the operating members, the toothed block can be connected to the seat and the gear rack can be connected to the at least one operating member. In order to activate, or conversely release, the fixation means the toothed block and the gear rack can be movable toward and away from each other substantially in the direction of their toothing.

It is on the other hand possible to envisage the toothed block and the gear rack being pivotable relative to each other substantially parallel to the toothing. The fixation can in this way also be realized and released again in simple manner.

If in that case there are a plurality of operating members, which are each separately displaceable relative to the seat, they can be each fixedly connected to a toothed block and the gear rack can be connected pivotally to the seat. A plurality of operating members can thus be locked, or conversely unlocked, simultaneously by pivoting the gear rack at the position of the seat. The operating members can further be displaced independently of each other relative to the seat.

According to a second aspect of the invention, the control device is characterized in that the displacing means comprise a pair of mutually parallel rails and a pair of bearing blocks slidable therealong. A better and more stable guiding of the seat relative to the operating members is achieved by making use of a pair of rails. The slidable bearing blocks provide for a smoother displacement than is possible with telescopic rods or sleeves.

A robust bearing-mounting of the seat relative to the operating members is obtained when each rail has a substantially round section and each bearing block has a substantially round opening through which the corresponding rail protrudes.

For optimum stiffness and strength of the guiding each rail preferably has a solid cross-section.

A stable construction is obtained when the rails have an intermediate spacing substantially corresponding to the width of the seat. The large track width provides for stability, while the seat can moreover be placed relatively low because it fits between the rails. This also results in a more sporting posture, this being particularly important in the case of driving games.

The rails can be connected to the seat and the bearing blocks can be connected to the at least one operating member. The operating member is in this case displaced relative to the seat.

It is on the other hand also possible for the rails to be connected to the at least one operating member and the bearing blocks to be connected to the seat. In this setup the seat is displaced relative to the operating member.

The rails are in this case advantageously mounted in a frame which carries the at least one operating member. Such a frame results in a robust construction.

An extremely strong construction suitable for use by several players in succession is obtained when the frame is substantially rectangular with two longitudinal girders extending on either side of the seat, a transverse girder behind a backrest of a seat and an elevated transverse girder at a distance in front of the seat.

Such a frame is easy to construct when the longitudinal and transverse girders are tubular.

For structural reasons as well as for optimal positioning of the different components of the control device it is recommended that the longitudinal girders are bent locally and a lattice is incorporated in the or each bent part.

A structurally simple embodiment of the device is obtained when the longitudinal girders and the rear transverse girder are formed integrally.

A robust video game unit is obtained when the elevated transverse girder carries a screen which forms part of the video game.

For a lifelike game experience, particularly when the video game forms a simulation of driving in a rally car, it is recommended that the at least one operating member comprises a gear lever connected pivotally to the frame.

For use of the control device in combination with a video game which involves driving with a racing car or rally car it is recommended that the at least one operating member comprises a set of pedals. It is hereby possible to accelerate and brake in natural manner.

With a view to optimal control of the game it is further recommended that the at least one operating member comprises a steering wheel.

In order to make the control device suitable for users of differing posture, it is then recommended that the screen and the steering wheel are connected for combined pivoting to the elevated transverse girder of the frame.

The screen and the steering wheel are in that case fixable in a number of pivoted positions relative to the frame by means of a gear rim and a cam engaging therein. Form-fitting fixation means are thus also provided for the screen and the steering wheel.

Figure 7:
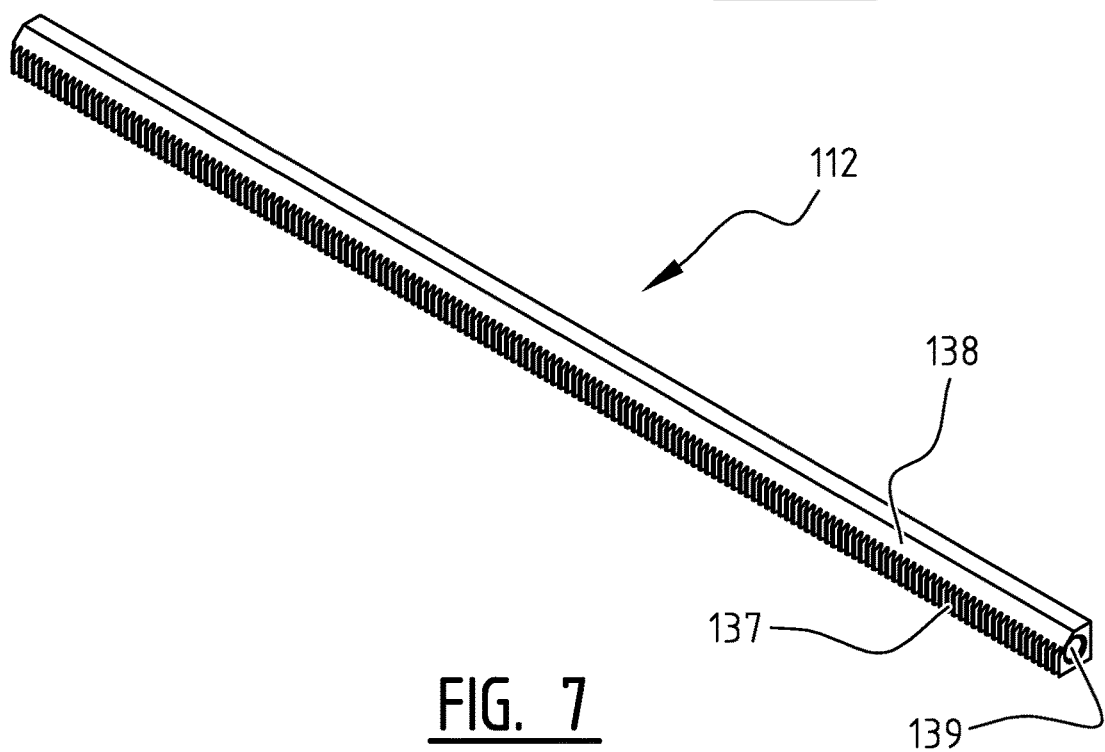
Figure 2:
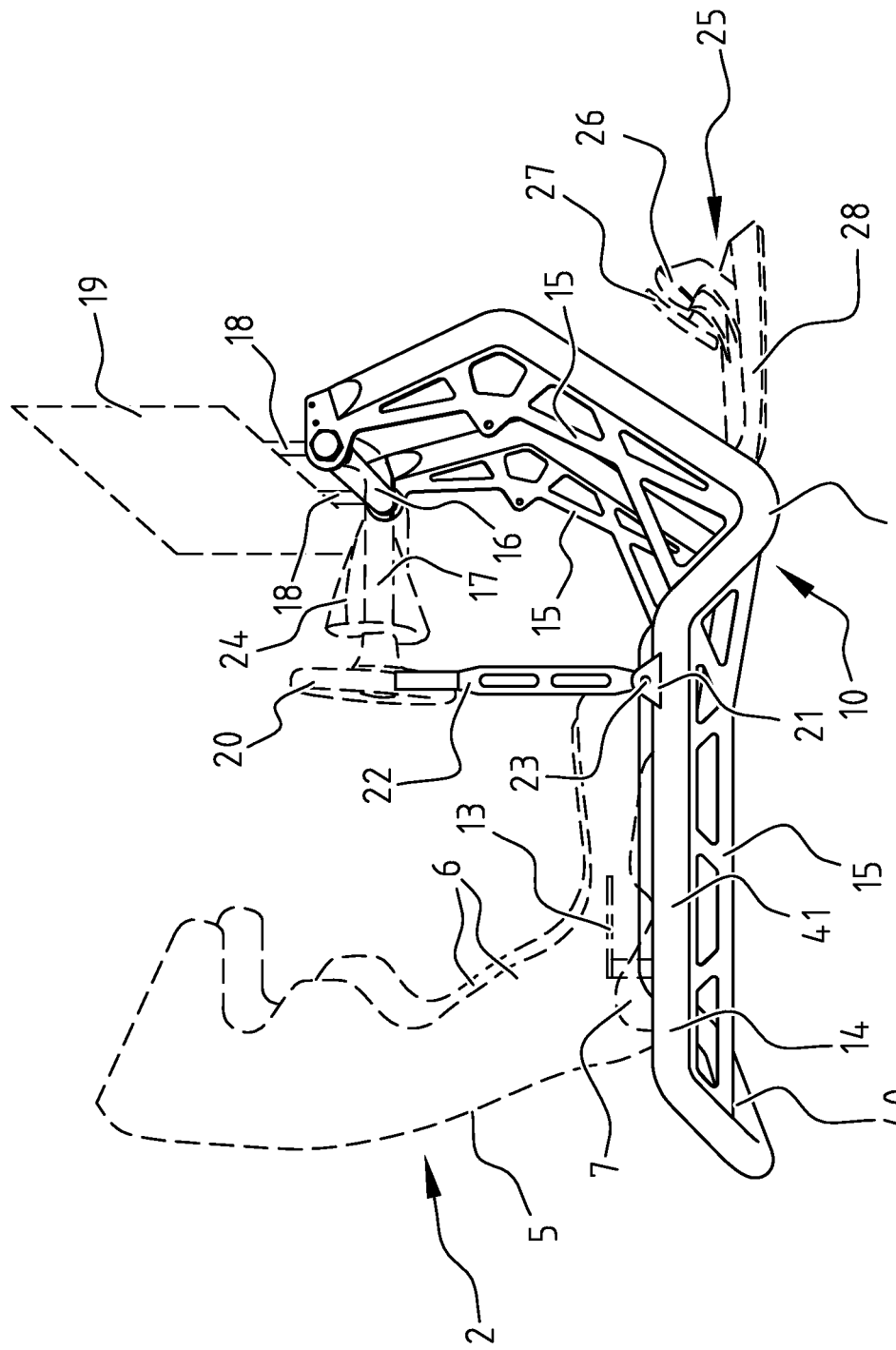
Figure 3:
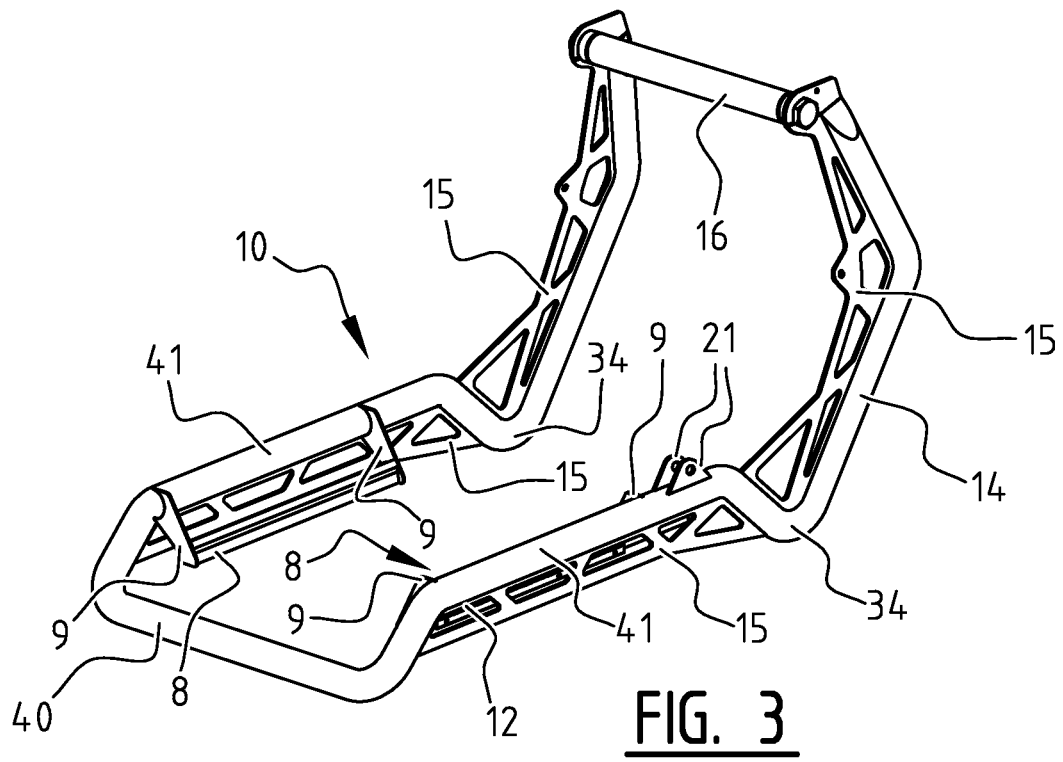
Figure 4:
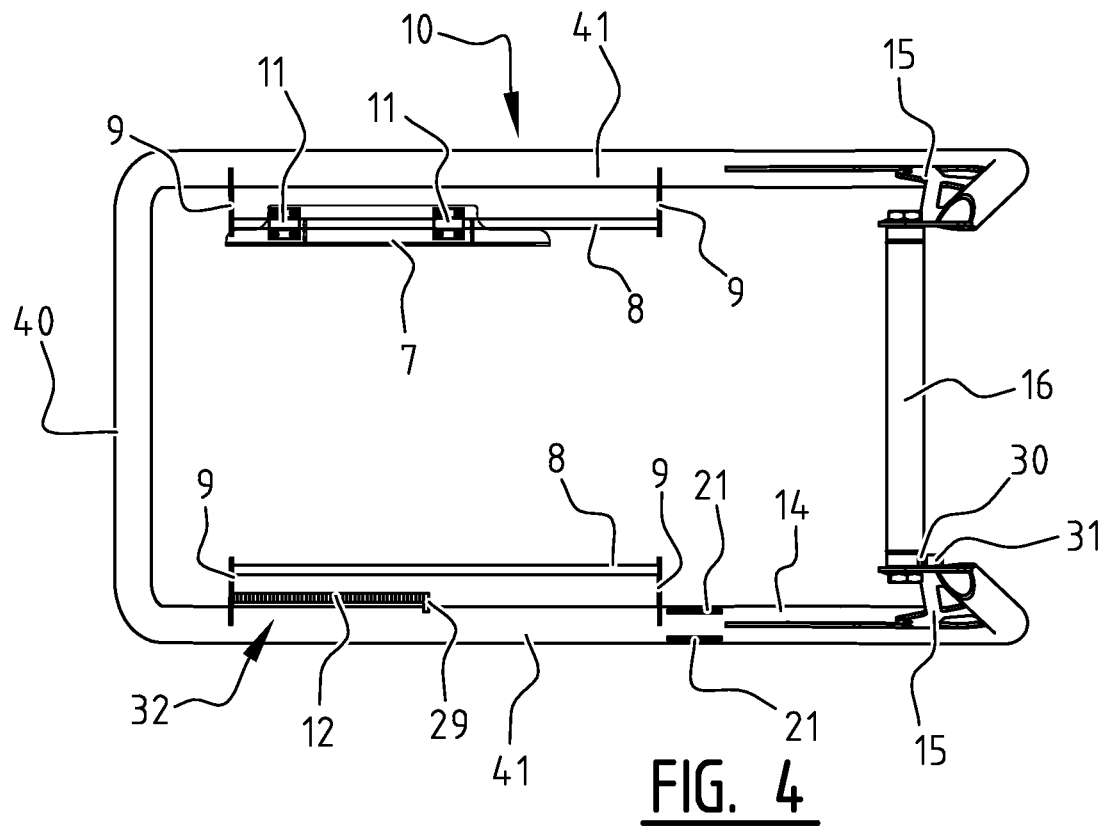
Figure 5:
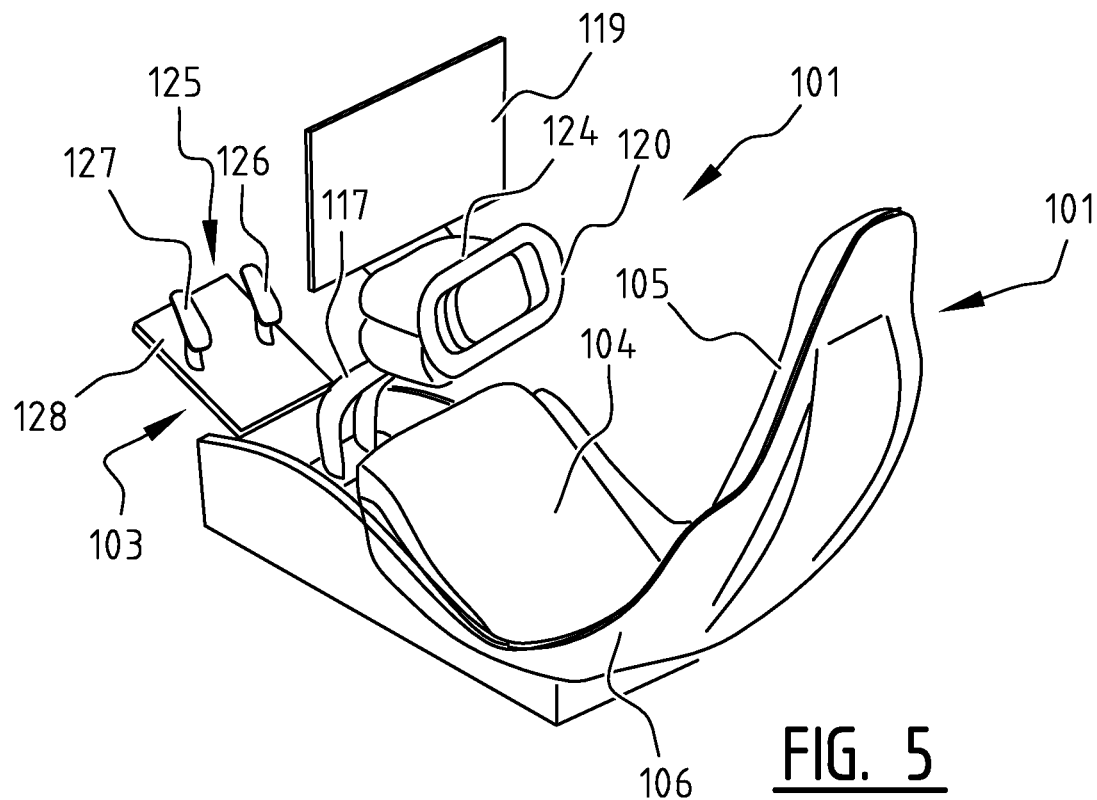
Figure 6:
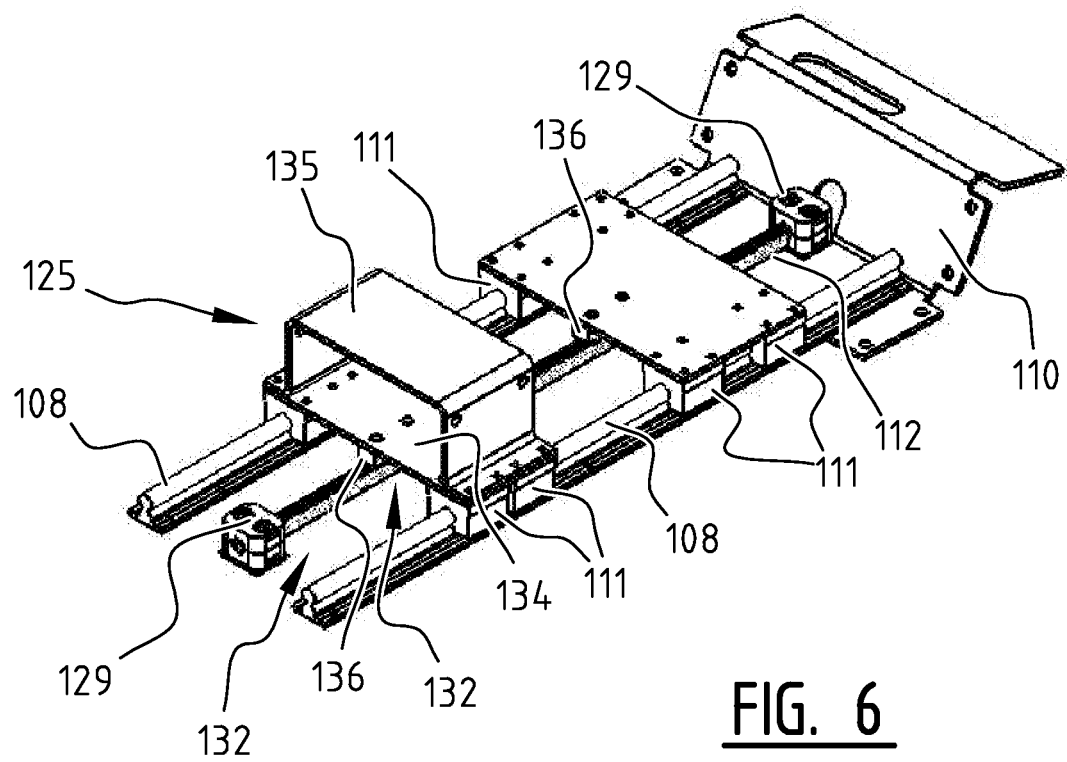

The invention will now be elucidated on the basis of two examples wherein reference is made to the accompanying drawing in which corresponding components are designated with reference numerals increased by 100, and in which:

FIG. 1 is a perspective view of the control device according to a first embodiment of the invention, FIG. 2 is a perspective side view of the control device of FIG. 1, FIG. 3 is a perspective view of the frame of the control device of FIGS. 1 and 2, FIG. 4 is a top view of the frame of FIG. 3, FIG. 5 is a perspective view of a second embodiment of a control device according to the invention for use in combination with a racing game, FIG. 6 is a perspective view of displacing means and fixation means for application in the control device of FIG. 5, and FIG. 7 is a perspective view of a pivotable gear rack for application in the control device of FIGS. 5 and 6.

A device 1 for controlling a video game comprises a seat 2 and a number of control members 3 connected thereto. Control device 1 further has means 33 for displacing seat 2 and operating members 3 relative to each other and means 32 for fixing seat 2 and operating members 3 in a number of different positions relative to each other. Seat 2 has a seat part 4, a backrest 5 and wings 6 and is shaped in the manner of a seat in a rally car. Attached to the underside of wings 6 are shells 7 which support a part of displacing means 33.

Displacing means 33 comprise according to the invention a pair of mutually parallel rails 8 and a number of bearing blocks 11 slidable therealong. In the shown embodiment rails 8 take a solid form and have a round section, while the bearing blocks each have a round opening with which they are arranged close-fittingly round the rail. In the shown embodiment seat 2 is placed between rails 8, thereby achieving a maximum track width and optimum stability. In this embodiment rails are connected to control members 3 via a frame 10 to be discussed below, while bearing blocks 11 are connected via the shells to seat 2. Seat 2 is thus displaceable here relative to operating members 3.

Each rail 8 is attached by means of two ears 9 to a longitudinal girder of frame 10. In the shown embodiment frame 10 is substantially rectangular in top view and has two longitudinal girders 41 extending on either side of seat 2, a transverse girder 40 behind backrest 5 of the seat and an elevated transverse girder 16 at a distance in front of seat 2.

Frame 10 takes a very robust form so as to impart thereto an appearance suited to rally racing. Frame 10 is constructed from tubes which are bent or folded locally in order to obtain the desired shape of frame 10. Lattices 15 are incorporated in the bent or folded parts for strengthening purposes. The rear transverse girder 40 forms one of the lowest points of frame 10 and supports on a ground surface. From here the longitudinal girders 41 are in the first instance bent upward so that they extend roughly at the height of seat surface 4 of seat 2. On the front side the longitudinal girders 41 are bent downward again whereby they define a front support point 34 which rests on the ground surface. From this point 34 the longitudinal girders 41 are bent upward again so that their outer ends are situated at a height where some of operating members 3, in this example steering wheel 20, are optimally placed. Longitudinal girders 41 and rear transverse girder 40 are formed as one whole 14 in the shown embodiment. This integral tubular construction 14 can otherwise be constructed from a number of tube segments welded to each other, or can be formed by a single tube with multiple bends. The front elevated transverse girder 16 is connected by means of bolts to the U-shaped remainder of frame 10.

The elevated transverse girder 16 carries one of the control members 3, in the shown embodiment as stated steering wheel 20. Mounted for this purpose on transverse girder 16 are two arms 17 which are directed toward seat 2 and between which a housing 24 carrying steering wheel 20 is suspended. In the shown embodiment a screen 19, which forms part of the video game, is also mounted by means of two spacers 18 on the elevated transverse girder 16. Steering wheel 20 and screen 19 are pivotable as one unit in the shown embodiment. The elevated transverse girder 16 can for this purpose itself be mounted pivotally between the ends of longitudinal girders 41, or it can function as shaft on which a sleeve with spacers 17, 18 thereon is pivotable. Because of the combined pivoting of screen 19 and steering wheel 20 the position of screen 19 will automatically follow the position of steering wheel 20, which will be set to the desired height by a user. In order to fix steering wheel 20 and screen 19 in the desired position there is arranged on the pivotable part a gear rim 30 into which engages a cam 31 arranged on the fixed frame. This cam 31 can for instance be held in engagement with gear rim 30 under spring tension and be released by means of a handle (not shown here). Spacers 18 which carry screen 19 can, just as arms 17, otherwise take a somewhat curved form, whereby screen 19 is situated in front of transverse girder 16 and thereby holds steering wheel unit 20, 24 in balance.

In addition to steering wheel 20 and screen 19, frame 10 also carries a gear lever 22 which is mounted pivotally on a shaft 23 between two flanges 21 welded to the frame tube. Just as steering wheel 20, this gear lever 22 is connected in controlling manner to the video game. Finally, the operating members can further also comprise a set of pedals 25 consisting of an accelerator pedal 26 and a brake pedal 27, which are each mounted movably in a mounting plate 28. The set of pedals 25 can be attached to frame 10 or can be attached to the ground surface in fixed position relative to the frame. Frame 10 and pedal set 25 can for instance be mounted together on a base plate.

According to another aspect of the invention, fixation means 32 are form-fitting. In the shown embodiment these fixation means 32 comprise a gear rack 12 and a toothed block engaging therein (not shown in this embodiment). Gear rack 12 is attached by means of ear 9, to which rail 8 is also attached, and a second ear 29 to a longitudinal girder of frame 10. Gear rack 12 is thus in this way connected via frame 10 to operating members 3. The toothed block is connected in this embodiment to seat 2. It is held in engagement with gear rack 12 by means of a spring (not shown) and can be released from gear rack 12 by means of a lever 13 mounted pivotally on the seat frame. When the toothed block is released from gear rack 12, seat 2 can be shifted over rails 8, whereby an optimal position of seat 2 can be set relative to operating members 3.

In another embodiment of control device 101 according to the invention, which is particularly suitable for simulating a racing car, for instance a Formula One car, it is not the seat 102 which is adjustable relative to operating members 103 but it is the seat 102 which forms the reference, and it is the operating members 103 which are adjustable. In this embodiment seat 102, which once again consists of a seat surface 104, a backrest 105 and wings 106, is mounted on a frame 110 of folded plate. Attached to this frame are two rails 108 which extend forward from seat 102. These rails 108 have a substantially Ω-shaped section with a constriction and a substantially round part thereabove. Slidable over this round part of rails 108 are bearing blocks 111 which are attached to sub-frames 133 and 134. Arranged on sub-frame 133 are legs 117 which carry a module 124 on which steering wheel 120 is mounted. Screen 119 is also mounted on module 124. Sub-frame 134 has an elevated part 130 on which pedal set 125 is mounted. This pedal set in turn comprises a footplate 128 and accelerator and brake pedals 126, 127 mounted movably thereon. Because pedal set 125 is mounted on an elevated part 135 and because the seat 102 is tilted quite far backwards, this embodiment of control device 101 makes possible a reclining driving position typical for Formula One cars. Fixation means 132 in this embodiment once again comprise a gear rack 112 which in this case is connected to seat 102. Fixation means 132 further comprise two toothed blocks 136 which are attached to sub-frames 133, 134. Sub-frames 133, 134, and thereby steering wheel 120 and pedal set 125, can in this way be adjusted independently of each other relative to seat 102. In contrast to the first embodiment, where the toothed block and gear rack 12 are movable toward and away from each other in the direction of the toothing, in this embodiment the toothed block 136 and gear rack 112 are pivotable parallel to the toothing relative to each other. Gear rack 112 is thus in practice mounted pivotally in pivot bearings 129 on the two ends thereof. One of these pivot bearings 129 is mounted on frame 110 while the other pivot bearing 129 is mounted on a ground surface. Frame 110, rails 108 and the front pivot bearing 129 will in practice all be mounted on a shared base plate. Gear rack 112 has a chamfered side 138 adjacently of toothing 137. By pivoting the gear rack through 45 degrees the toothing 137 is thus moved out of reach of toothed blocks 136 and the chamfered side 138 faces toward toothed blocks 136 instead. Because this chamfered side protrudes less far outside the pivot axis 139 of gear rack 112, toothed blocks 136 run clear of this chamfered side 138. In this position of the gear rack the sub-frames 133, 134 can thus be slid along rails 108 until steering wheel 120 and pedal set 125 take up an optimal position relative to seat 102. A handle (not shown here) is attached to gear rack 112 for the purpose of pivoting gear rack 112. Gear rack 112 is biased by a spring (not shown here) to the position in which toothing 137 is in engagement with toothed blocks 136, and operating members 103 are thus fixed relative to seat 102.

The invention thus provides a control device for use with a video game with which the operating members and the seat are displaceable in stable and properly guided manner relative to each other so as to thus set an optimal relative position. The seat and the operating members are moreover locked in highly reliable manner relative to each other in the set position by the form-fitting fixation means.

Although the invention has been elucidated above on the basis of two embodiments, it will be apparent that it is not limited thereto but can be varied in many ways. More than two rails could for instance be used for the displacement, while the rails could also have a different cross-sectional form. Bearings other than shown here could also be used. Other form-fitting fixation mechanisms could also be used instead of a toothing, such as for instance holes and a movable pin. Finally, operating members other than the shown steering wheel and the pedal set could also be used. If the video game were to involve for instance the control of an aircraft, the control members could comprise a control column or joystick and a throttle.

The scope of the invention is therefore defined solely by the following claims.

The invention claimed is:

1. A device for controlling a video game, comprising:
   a seat,
   at least one operating member connected to the video game,
   a mechanism for displacing the seat and the at least one operating member relative to each other, and
   a manually operable mechanism for fixing the seat and the at least one operating member in a number of different positions relative to each other,
   wherein the displacing mechanism comprises first and second rails and first and second bearing blocks slidable therealong, said first bearing block being slidable along said first rail and the second bearing block being slidable along said second rail,
   wherein the first and second rails are connected to the at least one operating member and the first and second bearing blocks are connected to the seat,
   wherein the first and second rails are mounted in a rigid frame which carries the at least one operating member, said rigid frame being rectangular with two longitudinal girders extending on either side adjacently of the seat, a rear transverse girder behind a backrest of the seat and an elevated transverse girder at a fixed distance in front of the rear transverse girder, and
   wherein each rail has a round section and each bearing block has a round opening through which the corresponding rail protrudes.

2. The control device as claimed in claim 1, wherein each rail has a solid cross-section.

3. The control device as claimed in claim 1, wherein the first and second rails have a spacing therebetween corresponding to a width of the seat.

4. The control device as claimed in claim 1, wherein the longitudinal girders and the transverse girders are each tubular.

5. The control device as claimed in claim 4, wherein the longitudinal girders are bent locally and a lattice is incorporated in the, or each, bent part.

6. The control device as claimed in claim 1, wherein the longitudinal girders and the rear transverse girder are formed integrally.

7. The control device as claimed in claim 1, wherein the elevated transverse girder carries a screen which shows the video game.

8. The control device as claimed in claim 1, wherein the at least one operating member comprises a gear lever connected pivotally to the frame.

9. The control device as claimed in claim 1, wherein the at least one operating member comprises a set of pedals.

10. The control device as claimed in claim 1, wherein the at least one operating member comprises a steering wheel.

11. The control device as claimed in claim 1, wherein the screen and the steering wheel are connected for combined pivoting to the elevated transverse girder.

12. The control device as claimed in claim 11, wherein the screen and the steering wheel are fixable in a plurality of pivoted positions relative to the frame by means of a gear rim and cam engaging therein.

13. The control device as claimed in claim 1, wherein the first and second rails are parallel.

14. A device for controlling a video game, comprising:
a seat,
at least one operating member connected to the video game,
a mechanism for displacing the seat and the at least one operating member relative to each other, and
a manually operable mechanism for fixing the seat and the at least one operating member in a number of different positions relative to each other,
wherein the displacing mechanism comprises first and second rails and first and second bearing blocks slidable therealong, said first bearing block being slidable along said first rail and the second bearing block being slidable along said second rail,
wherein the first and second rails are attached to a frame on which the seat is fixedly mounted and the first and second bearing blocks are connected to the at least one operating member.

15. The control device as claimed in claim 14, wherein each rail has a solid cross-section.

16. The control device as claimed in claim 14, wherein the at least one operating member comprises a set of pedals.

17. The control device as claimed in claim 14, wherein the at least one operating member comprises a steering wheel.

18. The control device as claimed in claim 14, wherein the first and second rails are parallel.

19. The control device as claimed in claim 14, wherein the at least one operating member comprises a set of pedals and a steering wheel, wherein the set of pedals is arranged on a first subframe to which a first set of said first and second bearing blocks is attached, and wherein the steering wheel is arranged on a second subframe to which a second set of said first and second bearing blocks is attached.

* * * * *